(12) United States Patent
Fukazawa et al.

(10) Patent No.: US 8,578,110 B2
(45) Date of Patent: Nov. 5, 2013

(54) MEMORY DATA BACKUP SYSTEM AND MEMORY DATA BACKUP CONTROL METHOD

(75) Inventors: Tatsuhiko Fukazawa, Odawara (JP); Seiichi Abe, Odawara (JP)

(73) Assignee: Hitachi, Ltd., Tokyo (JP)

( * ) Notice: Subject to any disclaimer, the term of this patent is extended or adjusted under 35 U.S.C. 154(b) by 467 days.

(21) Appl. No.: 12/989,703

(22) PCT Filed: Oct. 12, 2010

(86) PCT No.: PCT/JP2010/006062
§ 371 (c)(1),
(2), (4) Date: Oct. 26, 2010

(87) PCT Pub. No.: WO2012/049705
PCT Pub. Date: Apr. 19, 2012

(65) Prior Publication Data
US 2012/0089796 A1  Apr. 12, 2012

(51) Int. Cl.
*G06F 12/00* (2006.01)
*G06F 13/00* (2006.01)
(52) U.S. Cl.
USPC ........... 711/162; 711/161; 711/154; 711/167; 711/E12.103

(58) Field of Classification Search
USPC .................. 711/154, 161, 162, 167, E12.103
See application file for complete search history.

(56) References Cited

U.S. PATENT DOCUMENTS

| 5,717,936 | A | 2/1998 | Uskali | |
|---|---|---|---|---|
| 7,024,527 | B1* | 4/2006 | Ohr | 711/161 |
| 2002/0143410 | A1* | 10/2002 | Yance et al. | 700/11 |
| 2004/0165447 | A1 | 8/2004 | Roohparvar | |
| 2007/0255700 | A1 | 11/2007 | Okamoto et al. | |
| 2008/0082751 | A1 | 4/2008 | Okin et al. | |
| 2008/0184063 | A1* | 7/2008 | Abdulvahid | 714/6 |
| 2009/0172469 | A1 | 7/2009 | Xiao | |
| 2009/0249008 | A1 | 10/2009 | Hosaka | |

FOREIGN PATENT DOCUMENTS

JP  2009237881 A  10/2009

* cited by examiner

*Primary Examiner* — Midys Rojas
(74) *Attorney, Agent, or Firm* — Volpe and Koenig, P.C.

(57) ABSTRACT

A memory data backup system capable of shortening time required to back up data from a volatile memory to a nonvolatile memory is provided.
A nonvolatile memory module 100 is mounted on the same bus 102 as a bus where an interface between a memory controller 52A and a volatile memory module 52 exists.

14 Claims, 22 Drawing Sheets

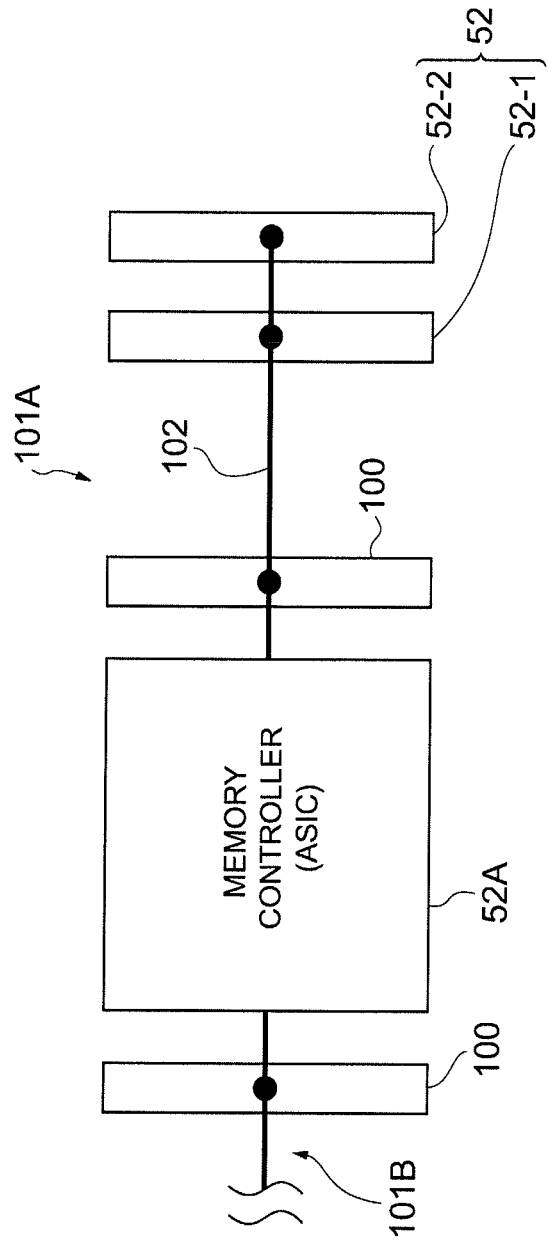

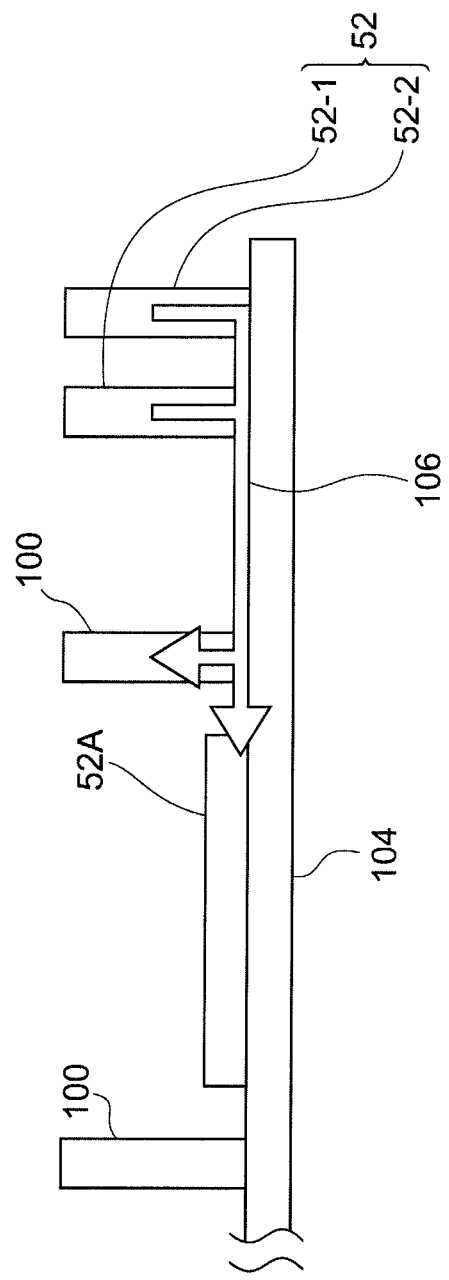

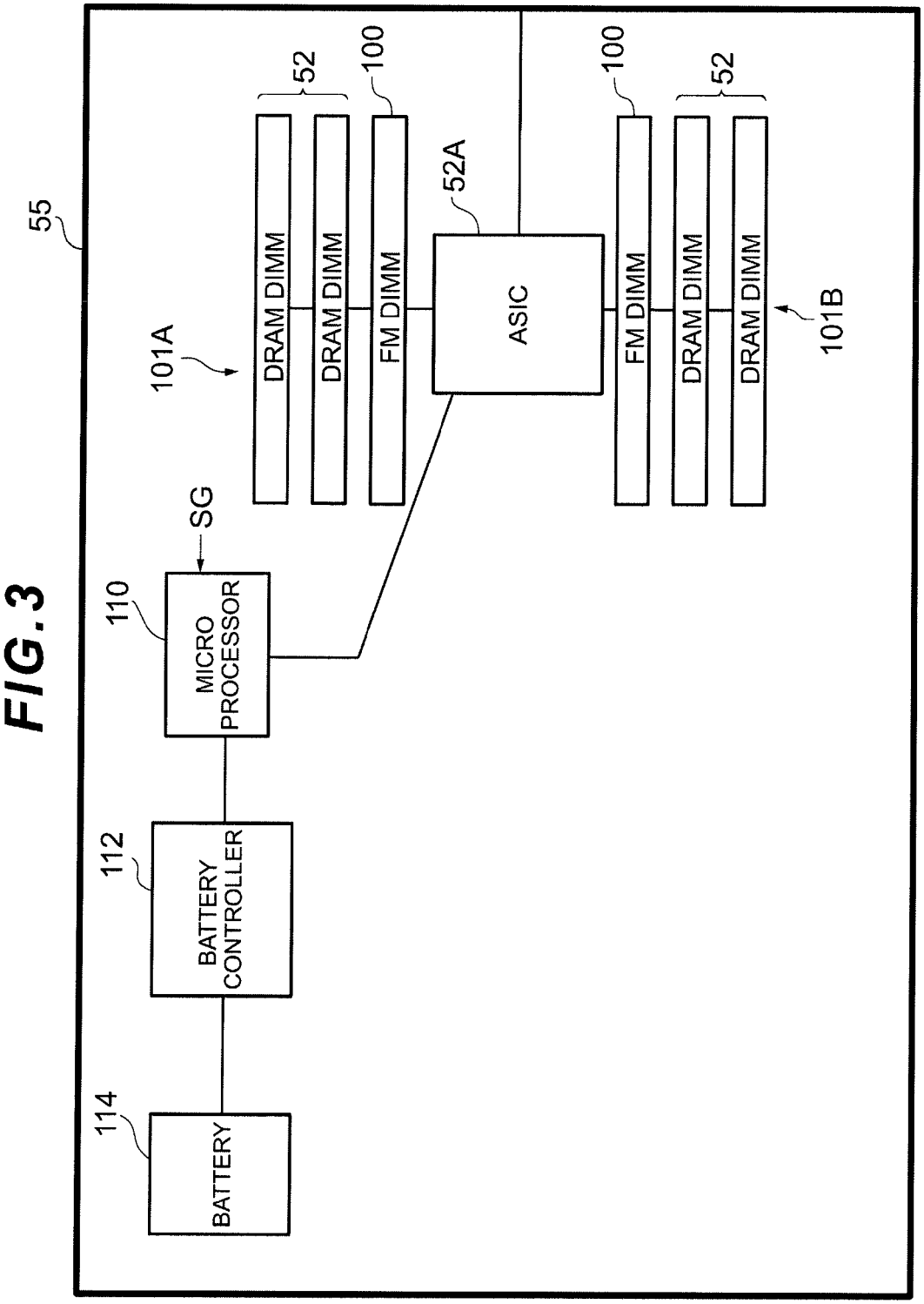

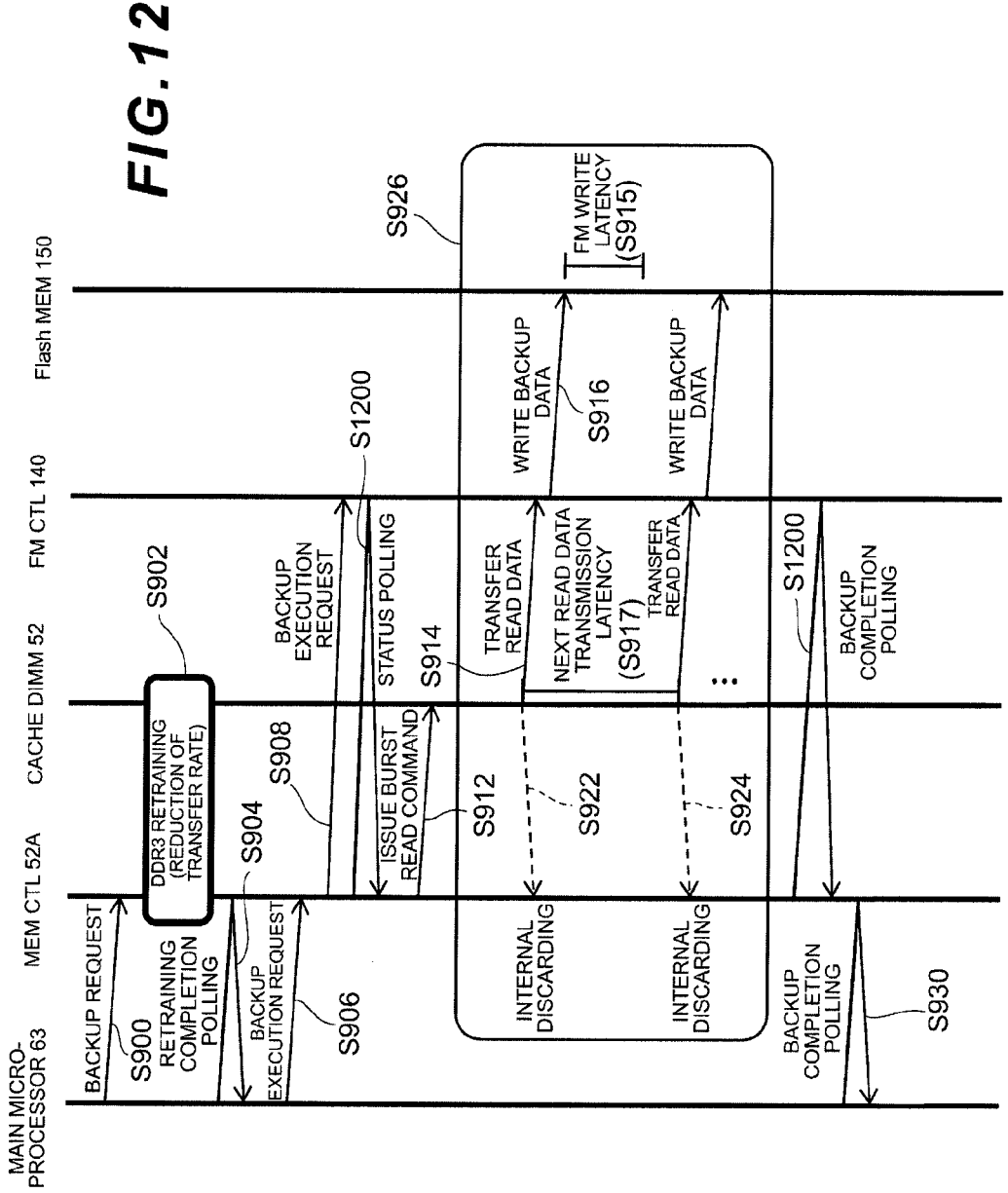

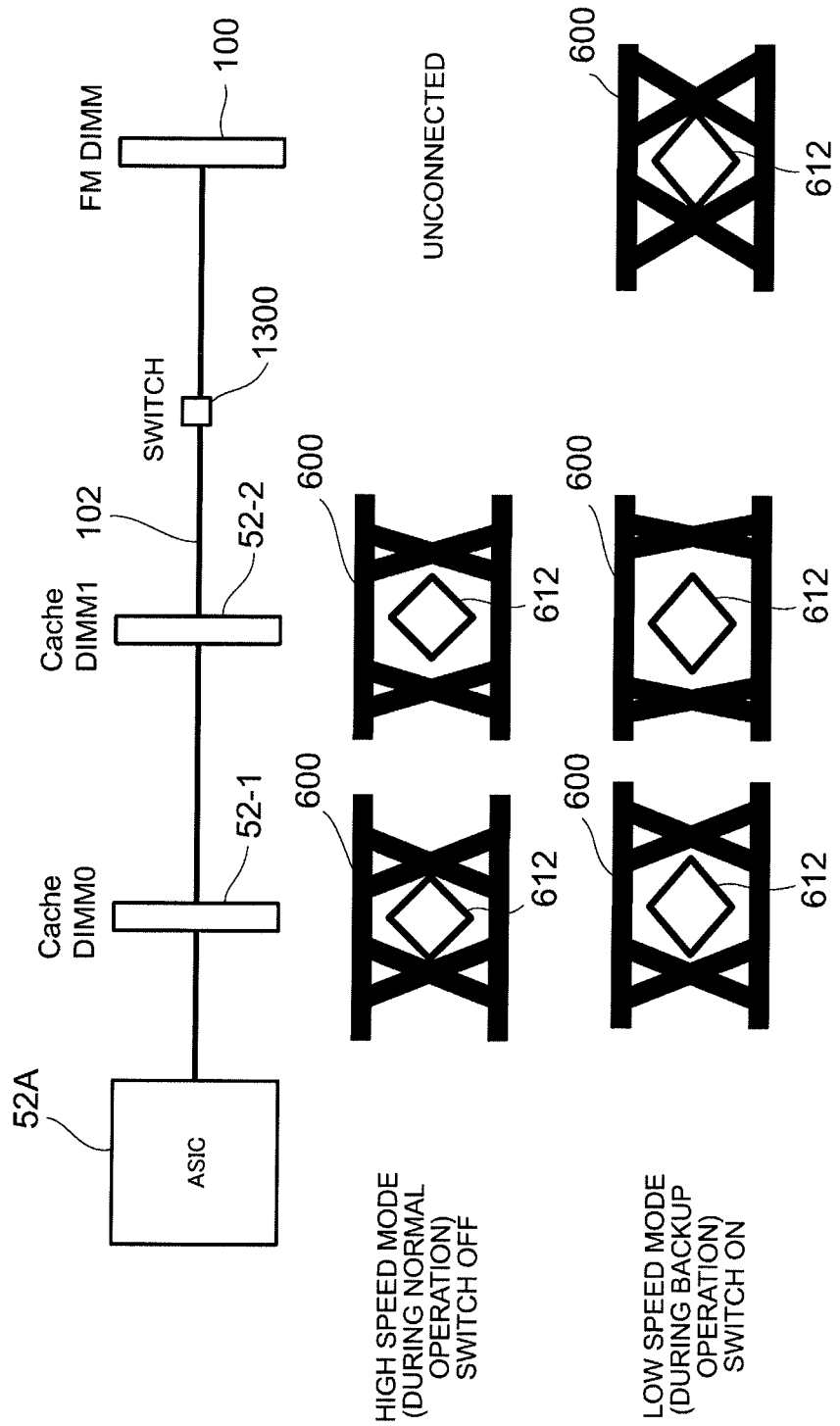

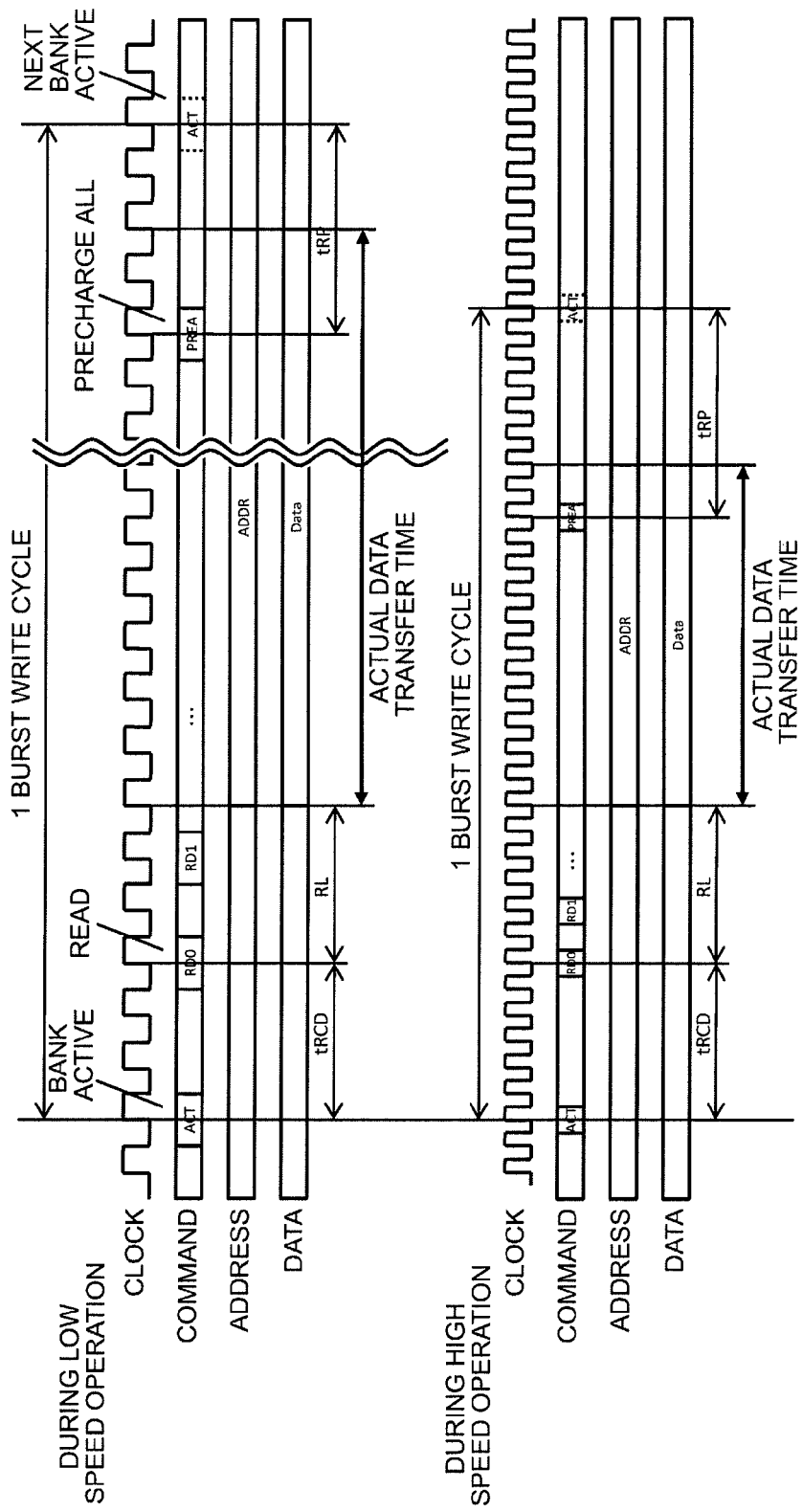

MEMORY DATA BACKUP SYSTEM AND MEMORY DATA BACKUP CONTROL METHOD

TECHNICAL FIELD

The present invention relates to a memory data backup system, for example, a data backup system for a cache memory in a storage apparatus.

BACKGROUND ART

A system for backing up data in a volatile memory for a disk array system has been known as a memory data backup system. For example a backup system described in Japanese Patent Application Laid-Open (Kokai) Publication No. 2009-237881 discloses that it supplies power from a battery to a memory controller and a main memory and saves data from the main memory to a nonvolatile memory at the time of a power failure.

It is also known that as a conventional example of a data backup system for a volatile memory, an interface dedicated for backups is provided in a memory controller and data in a cache memory is transferred via the dedicated interface to a nonvolatile memory such as SSD at the time of a power failure.

A conversion circuit for mutually converting a protocol for the dedicated interface to/from a protocol for an interface of a nonvolatile memory is provided between the dedicated interface and the nonvolatile memory.

CITATION LIST

Patent Literature

PTL 1: Japanese Patent Application Laid-Open (Kokai) Publication No. 2009-237881

SUMMARY OF INVENTION

Technical Problem

When a memory data backup system is configured so that cache memories are connected via a dual channel to a memory controller, the cache memories of both the channels have to back up data to a nonvolatile memory alternately via an interface dedicated for backups. Therefore, a considerable amount of time is required to complete the data backup.

If it takes a longer time to back up the data, a battery needs to supply power to the memory controller and a memory module during the data backup, so that it is inevitably necessary to increase the capacity of the battery. As a result, a volume proportion of the battery part in the disk array system increases, thereby causing a problem of reduction of the degree of freedom in circuit designing and system designing.

Furthermore, latency due to protocol conversion when backing up data from the volatile memory to the nonvolatile memory also gives rise to a problem of lengthening of the data backup time.

At present, nonvolatile memories that do not require protocol conversion are also being developed. However, they are not commonly used and are expensive, which is a bottleneck in applying such nonvolatile memories.

Therefore, it is an object of the present invention to provide a memory data backup system and memory data backup control method capable of shortening time required to back up data from a volatile memory to a nonvolatile memory.

Solution to Problem

In order to achieve the above-described invention, this invention is characterized in that a nonvolatile memory module is mounted on the same bus as a bus where an interface between a memory controller module and a volatile memory module exists.

According to this invention, data can be backed up to the nonvolatile memory as the memory controller accesses the volatile memory. Therefore, even as many volatile memory modules as a plurality of channels exist, no interface dedicated for data backups is required. So, latency due to protocol conversion will not occur. Furthermore, backup time can be reduced more by backing up data for each of multiple memory channels in parallel.

Advantageous Effects of Invention

According to this invention, it is possible to provide a memory data backup system and memory data backup control method capable of shortening time required to back up data from a volatile memory to a nonvolatile memory.

BRIEF DESCRIPTION OF DRAWINGS

FIG. 2A is a plan view of a cache memory package.

FIG. 2B is a side view of the cache memory package.

FIG. 3 is a hardware block diagram of the cache memory package.

FIG. 12 is a timing chart showing the operation of the cache memory package where the FM controller is a master and the memory controller is a slave.

FIG. 13B is a block diagram of another example in which the nonvolatile memory package is mounted in the cache memory package and a switch is turned on.

FIG. 14 shows eye pattern forms of the carrier waveform at a first cache DIMM, a second cache DIMM, an FM DIMM respectively when the switch is turned on or off according to the examples shown in FIG. 13A and FIG. 13B.

FIG. 20 is a waveform chart when reading data, which shows timing differences due to DDR3 transfer speeds.

DESCRIPTION OF EMBODIMENTS

Figure 1:
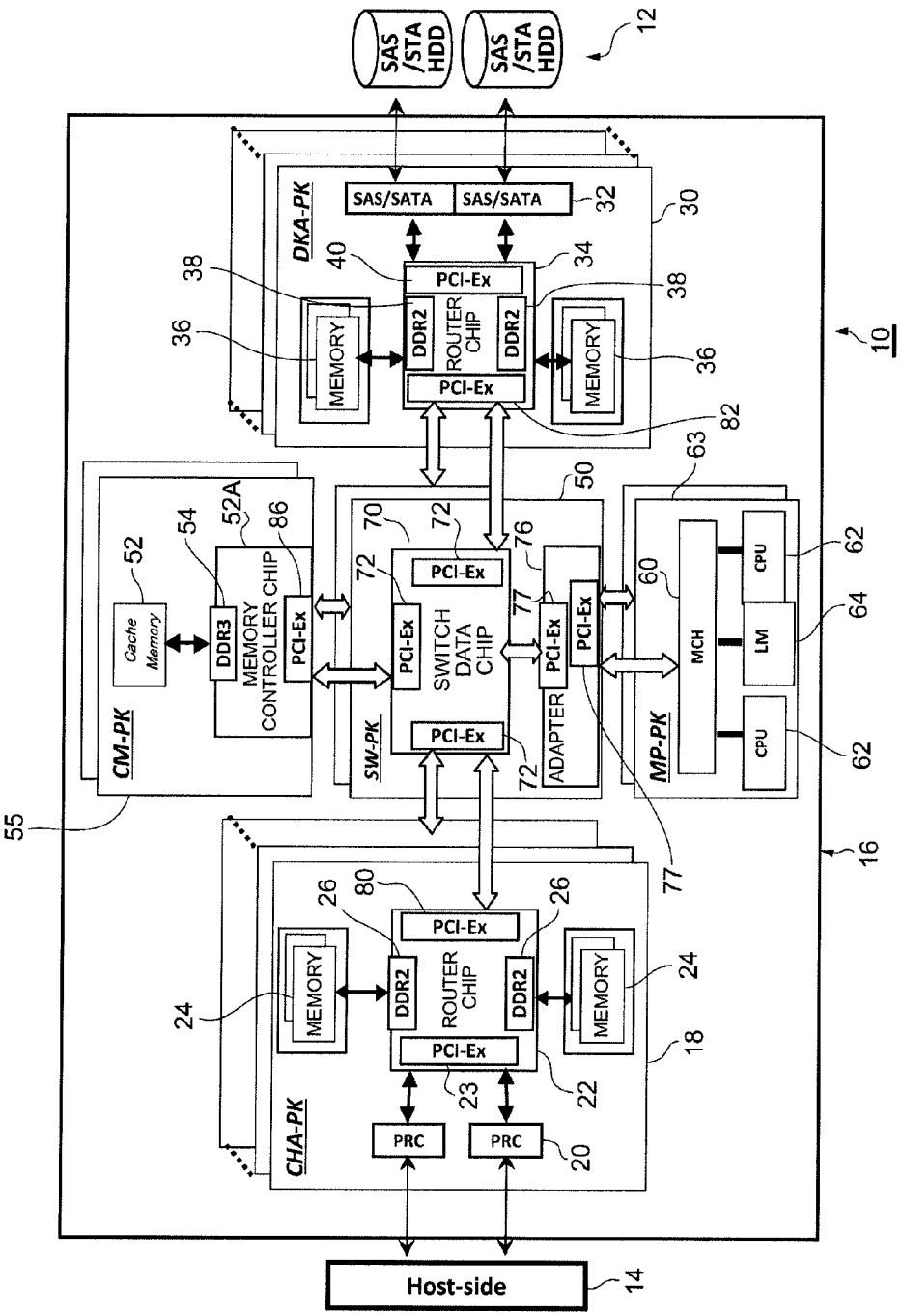
FIG. 1 is a block diagram of a storage apparatus to which the memory data backup system according to this invention is applied.

Next, embodiments of the present invention will be explained with reference to the attached drawings. FIG. 1 is a block diagram of a storage apparatus 10 to which a memory data backup system according to this invention is applied. The storage apparatus is mainly constituted from a storage device group 12 and a storage controller 16 for controlling data transfer between a host system 14 and the storage device group 12.

A plurality of control packages constituting the storage controller 16 are connected to each other by an internal bus architecture in a personal computer, such as PCI, or preferably by a bus that realizes high-speed serial data transfer protocol, such as PCI Express.

The storage controller 16 includes, at its front end, a channel adapter package (CHA-PK) 18 for connecting with the host system 14. The CHA-PK 18 includes a protocol chip (PRC) 20 for converting the Fibre Channel, which is a data protocol for the host system 14, to a PCI Express (PCI-Ex) interface, and a router chip 22 for routing data and commands from the host system.

The router chip 22 has a PCI-Ex interface 23 and is connected with the protocol conversion chip 20 via the PCI-Ex interface 23. A memory 24 is a volatile DIMM used to temporarily buffer data during data transfer to/from the host; and the router chip 22 and the memory 24 are connected to each other via, for example, a DDR2 interface 26.

The storage controller 16 includes, at its back end, a disk adapter package (DKA-PK) 30 for connecting with the storage devices 12. Examples of the storage devices are hard disk drives using SATA or SAS as interfaces.

The DKA-PK 30 includes a protocol chip (PRC) 32 for converting the SAS/SATA, which is the data protocol for the storage devices 12, into the PCI-Ex interface, and a router chip 34 for routing data and commands. A memory 36 is a volatile DIMM used to temporarily buffer data during data transfer to/from the disks; and the router chip 34 and the memory 36 are connected to each other via, for example, a DDR2 interface 38. The reference numeral 40 represents a PCI-Ex interface for the DKA-PK, which is connected to the PRC 32.

Furthermore, the storage controller 16 includes: a cache memory package (CM-PK) 55 for buffering data between the host system 14 and the storage devices 12; a microprocessor package (MP-PK) 63 for performing command and arithmetic processing; and a switch package (SW-PK) 50 for switching mutual exchanges of data and commands between the CHA-PK 18, the DKA-PK 3, the CM-PK 55, and the MP-PK 63.

The CM-PK 55 includes a cache memory unit 52 and a memory controller 52A for controlling writing of data to the cache memory unit 52 and reading of data from the cache memory unit 52. The memory controller 52A is composed of, for example, an ASIC.

A data backup system according to this invention is mounted in the CM-PK 55 as described later. The cache memory unit 52 has a plurality of channels, for example, two channels, to the memory controller 52A and the cache memory unit 52 of each channel includes a volatile memory module composed of, for example, a DRAM DIMM, and a nonvolatile memory module composed of, for example, a flash memory (FM) DIMM. The volatile memory module and the nonvolatile memory module execute data transfer by using the same type of interface, for example, using DDR3 as an interface. The memory controller 52A is connected via the DDR3 interface 54 to the cache memory unit 52 and the flash memory module. Incidentally, DDR2 may be adopted as the interface instead of DDR3.

The MP-PK 63 includes an MCH (Memory Controller Hub) 60, CPUs 62, each of which connects with the MCH 60, and a local memory (LM) 64 and executes command and arithmetic processing for transferring data between the host system 14 and the storage devices 12.

The SW-PK 50 is configured so that a switch chip 70 is connected with other packages via PCI-Ex interfaces 72; and furthermore, the SW-PK 50 has an adapter chip 76 for controlling connection with the MP-PK 63. The adapter chip 76 is connected via PCI-Ex interfaces 77 to the switch chip and the MCH 60.

Incidentally, the reference numeral 80 represents a PCI-Ex interface to be connected to the PCI-Ex interface 72 for the SW-PK 50; the reference numeral 82 also represents a PCI-Ex interface for the DKA-PK 30 to be connected to the PCI-Ex interface 72 for the SW-PK 50; and the reference numeral 86 also represents a PCI-Ex interface for the CM-PK 55 to be connected to the PCI-Ex interface 72 for the SW-PK 50.

Control resources such as the CHA, DKA, CM, MP, and SW are packaged as described above and a package can be added or removed according to the usage environment of users or requests from the users.

Next, the details of the cache memory package (CM-PK) 55 will be explained. FIG. 2A is a plan view of the CM-PK 55, in which the memory controller 52A composed of an ASIC is connected with the cache memory unit 52 via a bus 102. A flash memory (FM) DIMM 100 which is a nonvolatile memory module is mounted on this bus 102.

This FM DIMM 100 is also connected to the memory controller 52A and the cache memory unit 52 via the DDR3 which is the same interface as that of the cache memory unit 52. The FM DIMM 100 backs up data of the cache memory unit 52 which is a volatile memory, for example, at the time of a power failure.

The cache memory unit 52 is constituted from a first module 52-1 and a second module 52-2. The number of modules can be changed as appropriate according to the required capacity of the CM-PK. The cache memory module is a volatile memory composed of, for example, a DRAM DIMM as mentioned earlier.

The reference numeral 101A represents a first channel constituted from the volatile memory module and the nonvolatile memory module and the CM-PK 55 also has a second channel 101B having the same configuration as that of the first channel. The memory controller 52A writes the same data to the cache memory unit 52 of each channel to make it redundant.

FIG. 2B is a side view of the CM-PK and the reference numeral 104 represents a main substrate of the CM-PK 55. The reference numeral 106 represents a flow of data when backing up data of the cache memory unit 52 to the FM DIMM 100.

As mentioned earlier, the FM DIMM 100 is mounted on the same bus as the bus 102 where the interface between the memory controller 52A and the volatile memory 52 exists. Therefore, since the cache memory unit 52 and the memory controller 52A are connected to the FM DIMM 100 via the same type of interfaces, latency due to protocol conversion required when different types of interfaces are used will not occur.

Since the FM DIMM 100 is connected to the bus 102 linking the cache memory unit 52 and the memory controller 52A, it enables a data backup during the course of data transfer between the memory controller 52A and the volatile memory 52.

Since the FM DIMM 100 exists in each channel of the plurality of channels, it is unnecessary to provide the memory controller 52A with an interface dedicated for data backups. As a result, data of the cache memory unit 52 can be backed up in a short period of time and an increase of the CM-PK battery capacity is not required.

FIG. 3 is a block diagram of the cache memory package (CM-PK) 55. The reference numeral 110 represents a microprocessor for controlling a battery controller 112 and the memory controller 52A. The battery controller 112 controls a battery 114. Regarding a battery control form, power of the battery may be supplied to the CM-PK 55 at the time of a power failure.

The processor 110 controls the memory controller 52A for executing backups. A check signal SG is supplied from a power supply circuit for the storage controller 16 to the processor 110. The processor 110 detects the occurrence of an unplanned power failure by using the check signal 110 and controls the battery controller 112 based on the detected result.

Figure 4:
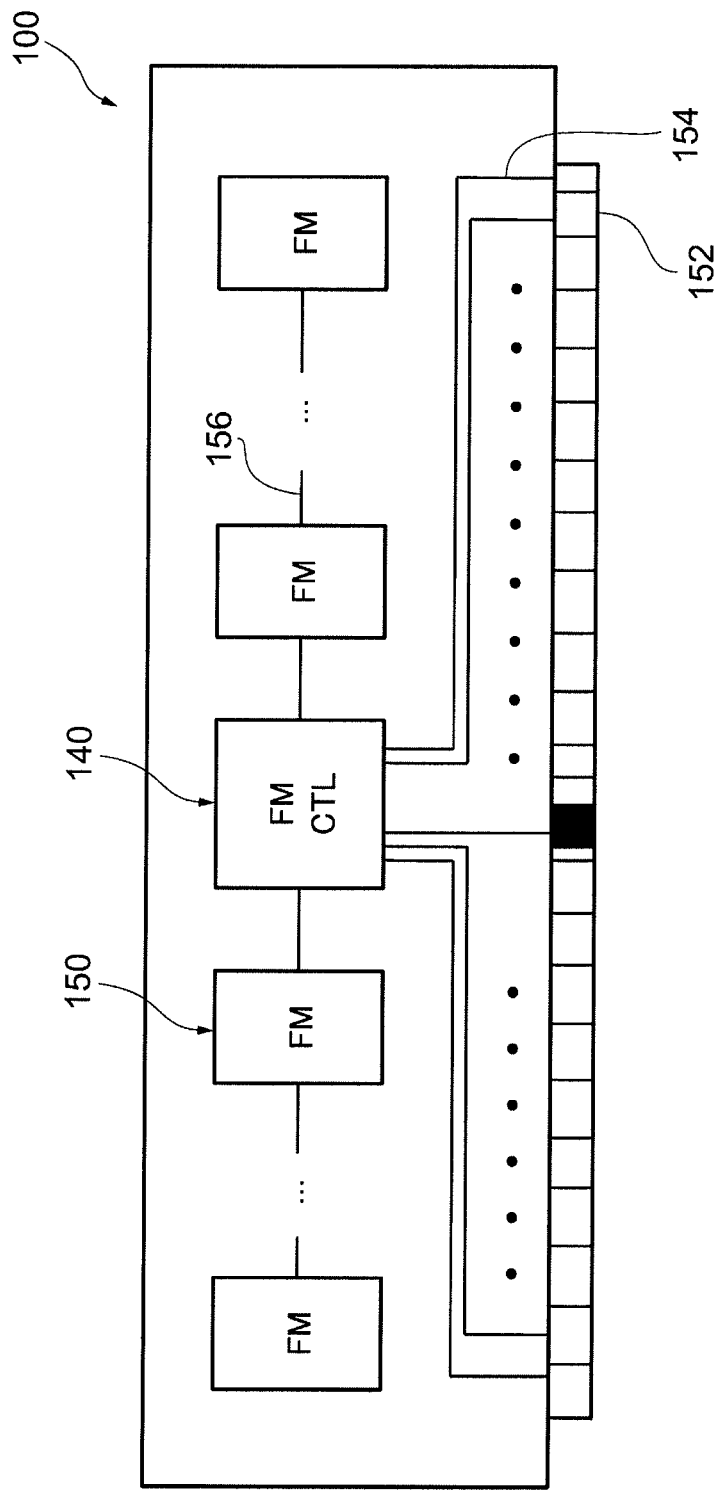
FIG. 4 is a front view of a flash memory module constituting a nonvolatile memory, including a hardware block view of the flash memory module.

Next, the details of the nonvolatile memory will be explained. FIG. 4 is a front view of the flash memory module (the FM DIMM) 100 constituting the nonvolatile memory, including a hardware block view of the FM DIMM 100.

An FM controller 140 which is composed of an ASIC or FPGA itself exists at the center of the module 100 and a plurality of flash memory cell array units 150 exist on both sides of the FM controller 140. The plurality of flash memory cell array units 150 are sequentially connected to a bus 156 which is connected to the FM controller 140. The reference numeral 152 represents a plurality of pin areas connected to the substrate and each pin connects to the controller 140 via the bus 154. The FM controller 140 controls reading of data from, and writing of data to, the flash memory cell array units.

The FM DIMM 100 has a storage capacity equal to or more than the total capacity of a plurality of cache DIMMs 52.

Furthermore, a cache memory may be mounted on this FM DIMM in order to improve the performance.

Figure 5:
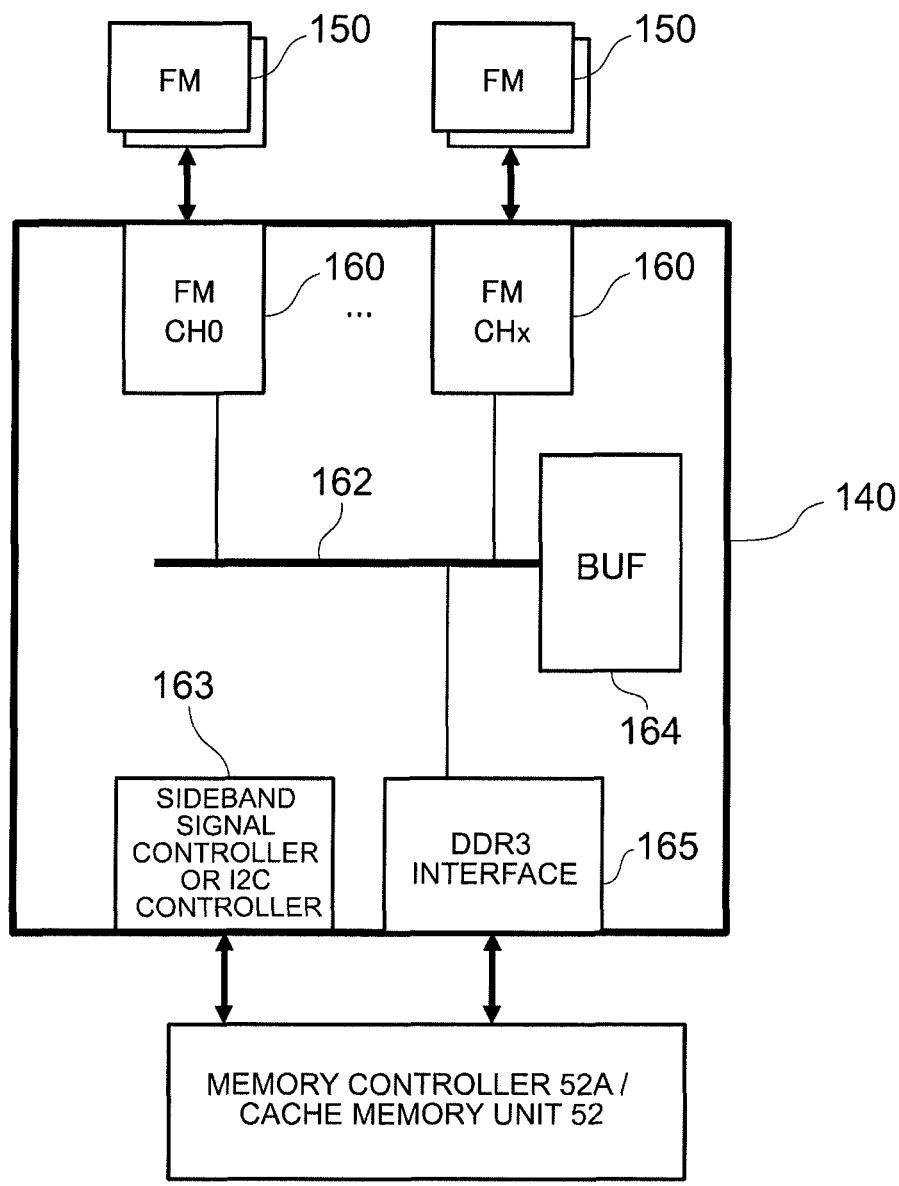
FIG. 5 is a hardware block diagram of an FM controller.

FIG. 5 is a block diagram of the FM controller 140 and the flash memory controller 140 includes adapters (from FM CH0 to FM CHx) 160 composed of a plurality of channels, each of which connects to each flash memory cell array unit 150, a DDR3 interface controller 165 connected to the DDR interface of the memory controller 52A or the cache memory unit 52, a buffer 164 for buffering data between the flash memory cell array units 150, and an internal bus 162 for connecting the above components to each other.

Once a signal received via the DDR3 interface 165 is buffered by the buffer 164, it is then transferred via the adapter 160 to the flash memory cell array unit 150. The same applies to a signal from the flash memory cell array unit 150 to the DDR3 interface 165.

The FM controller 140 establishes an interface with the memory controller by means of a sideband, but a general-purpose interface such as I2C/SMBus may be used. The reference numeral 163 represents a controller therefore.

Figure 6:
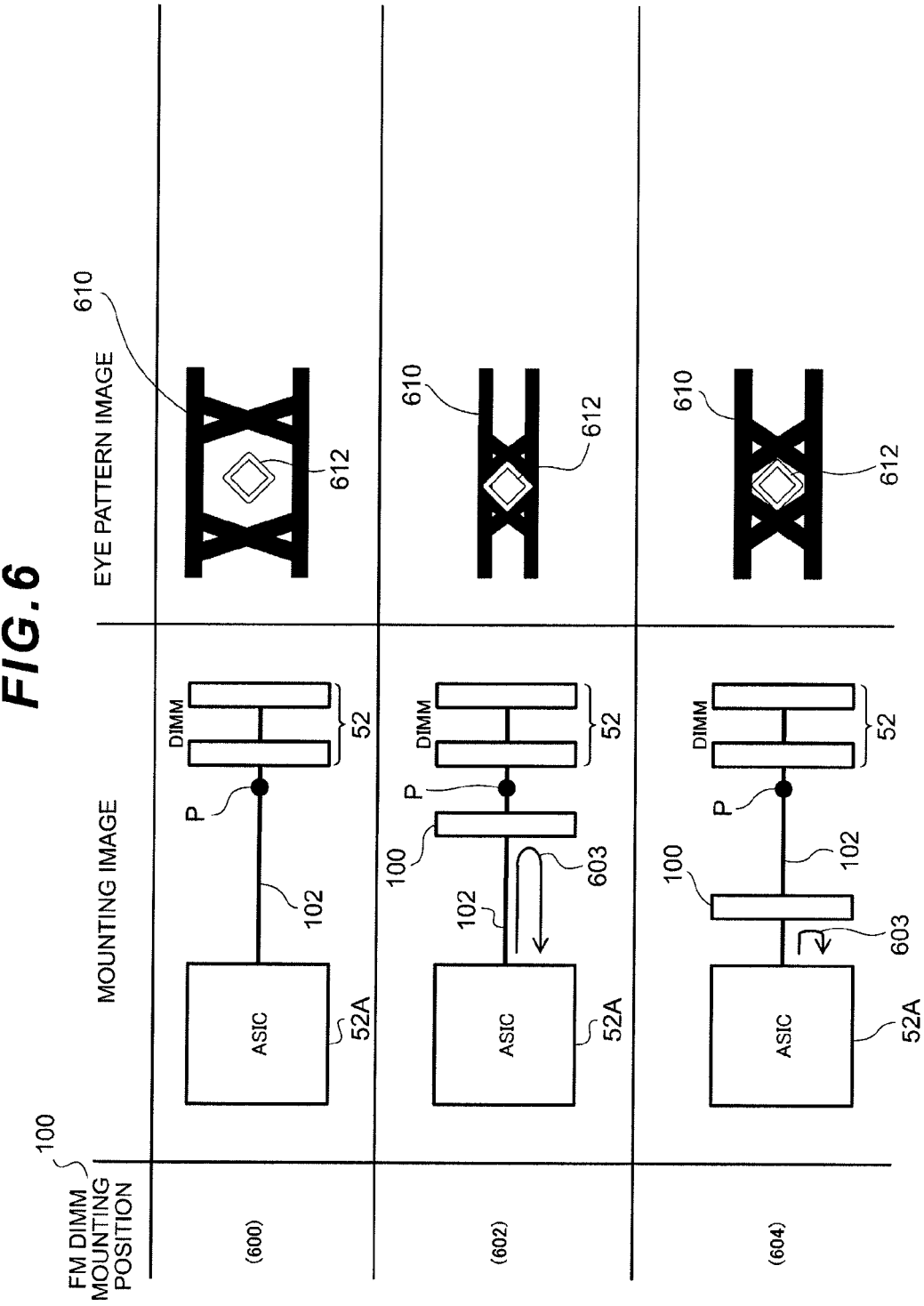
FIG. 6 shows eye pattern changes of a carrier wave when a nonvolatile memory module is mounted between a volatile memory module and a memory controller.

If the FM DIMM 100 is mounted on the bus 102 for connecting the memory controller 52A and the cache memory unit 52, it will affect the quality of a data carrier waveform. So, a preferred embodiment of the FM DIMM has been examined. Row (600) in FIG. 6 shows an eye pattern 610 of an observed waveform at an observation point P (an input terminal of the cache DIMM) before mounting the FM DIMM 100 on the bus 102.

Since there is no reflection factor for the carrier wave in the middle of the transmission line 102, the waveform quality is good. The reference numeral 612 represents a pattern mask indicating a waveform fluctuation limit defined by DDR3 standards. If the pattern mask 612 does not overlap with the eye pattern 610, there will be no bit error and the cache memory DIMM 52 can read data.

On the contrary, row (602) indicates a form in which the FM DIMM 100 is mounted between the cache DIMM 52 and the memory controller 52A and the FM DIMM 100 is located comparatively far from the memory controller 52A. On the other hand, row (604) indicates a form in which the FM DIMM 100 is located comparatively close to the memory controller 52A.

Since the FM DIMM 100 is located far from the memory controller 52A in the former form (602), the carrier wave from the memory controller 52A toward the cache DIMM 52 will be significantly influenced by a reflection 603 and its quality will degrade. As a result, the eye pattern 600 becomes greatly distorted, thereby interfering with the mask pattern 612 and causing the cache DIMM 52 to fail to receive data correctly.

On the other hand, since the FM DIMM 100 is located close to the memory controller 52A in the latter form (604), the reflection 603 by the FM DIMM 100 has a less impact on the carrier wave; and the eye pattern 610 becomes smaller, but not so much as to overlap with the pattern mask 612. Therefore, from the viewpoint of the impact on the cache DIMM 52, the FM DIMM 100 being located as closer as possible to the memory controller 52A is favorable within the limits for mounting the FM DIMM 100 on the CM-PK 55.

Figure 7:
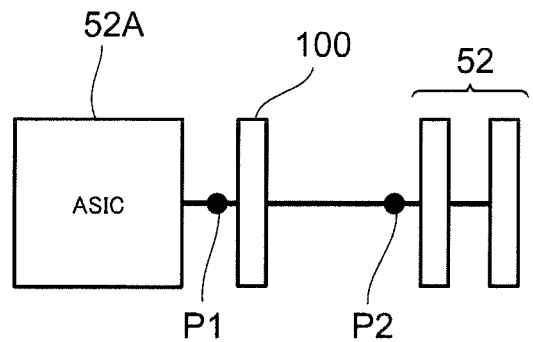
FIG. 7 is a block diagram of the cache memory package showing the state where wave pattern detection points are placed at an input terminal for the nonvolatile memory module and an input terminal for the volatile memory module.

Next, the quality of the waveform of the FM DIMM 100 itself in the form where the FM DIMM 100 is located close to (or as closer as possible to) the memory controller 52A will be examined. Now, wave pattern detection points P1 (an input terminal of the FM DIMM 100) and P2 (an input terminal of the cache DIMM 52) are placed as shown in FIG. 7.

Figure 8:
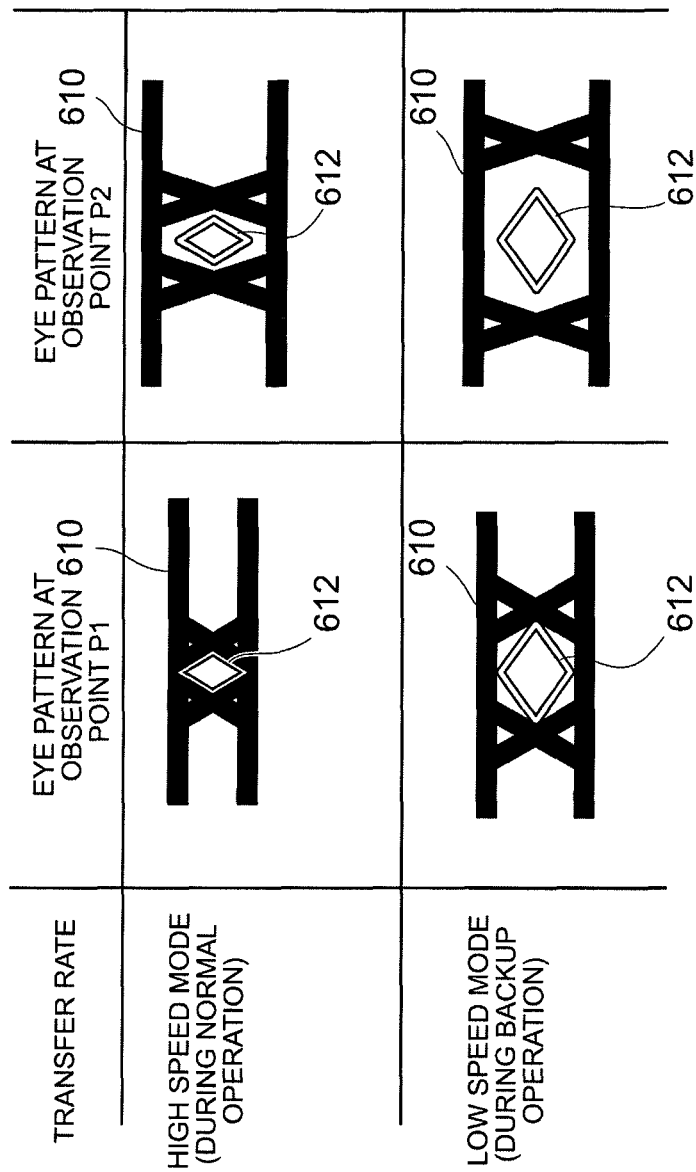
FIG. 8 is a graph showing eye patterns of the detected waveform in FIG. 7.

FIG. 8 summarizes the influence on the waveform quality. If a data transfer speed is set to a high speed mode used during the normal operation of the CM-PK (for example, 1600 Mbps according to the DDR3 standards), the eye pattern 610 at the FM DIMM 100 as observed at the observation point P1 crosses over the pattern mask 612, so that the FM controller 140 cannot write data to the flash memory 150. Under this circumstance, the eye pattern 610 of the carrier wave at the cache DIMM 52 does not cross over the pattern mask 612, so that the cache DIMM 52 can read/write data.

On the other hand, if the transfer speed is set to a low speed mode (for example, 800 Mbps according to the DDR3 standards), the pattern mask 612 expands as compared to the case of the high speed mode, but the eye pattern 610 does not become so distorted as to overlap with the pattern mask 612 at either the FM DIMM 100 or the cache DIMM 52 and the memory controller 52A can read/write data also to the FM DIMM 100.

So, the system is designed so that, except when executing a backup of data in the cache memory unit 52, the data transfer speed for the DDR interface is set, for timing closure, to the highest or high data transfer speed and writing of data to the cache memory unit 52 is prioritized. Since a data backup to the FM DIMM 100 is not necessary in this situation, there will be no inconvenience even if data cannot be written to the FM DIMM.

On the other hand, if the memory controller 52A needs to back up data from the cache memory unit 52 to the FM DIMM 100 at the time of, for example, a power failure or maintenance, the data transfer speed for the DDR interface is changed to a low data transfer speed. Since the timing closure has been already performed at the high speed in this case, there will be no problem if the data transfer speed is changed to a low speed.

Figure 19:
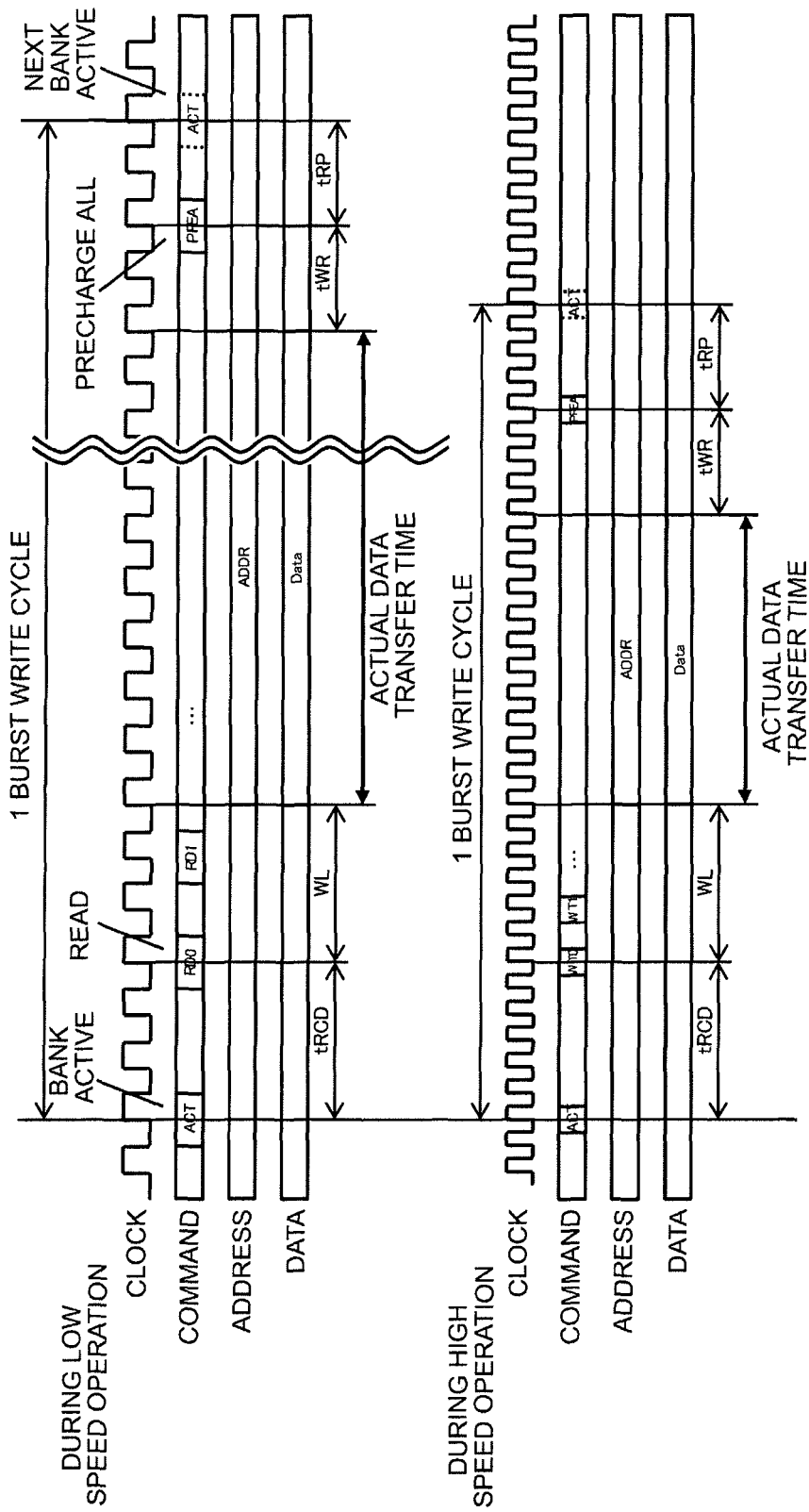
FIG. 19 is a waveform chart when writing data, which shows timing differences due to DDR3 transfer speeds.

FIG. 19 and FIG. 20 are waveform charts showing timing difference due to the DDR3 transfer speeds. FIG. 19 is a waveform chart when writing data, while FIG. 20 is a waveform chart when reading data. Since tRCD, WL, tWR, tRP, RL, and tRP are specified by time, their values are almost constant regardless of the speeds; and actual data transfer time can be reduced in the state of high speed timing by an amount of time saved by an increase of the speed.

Incidentally, the data transfer speed in the low speed mode is not limited to the aforementioned value. It is only necessary to reduce the data transfer speed to the degree enabling writing of backup data to the nonvolatile memory module and to the degree capable of complying with permissible backup time. The capacity of the battery 114 is designed in consideration of time required to write as much data as the capacity of the cache memory unit 52 to the nonvolatile memory 100 in the low speed mode.

Figure 9:
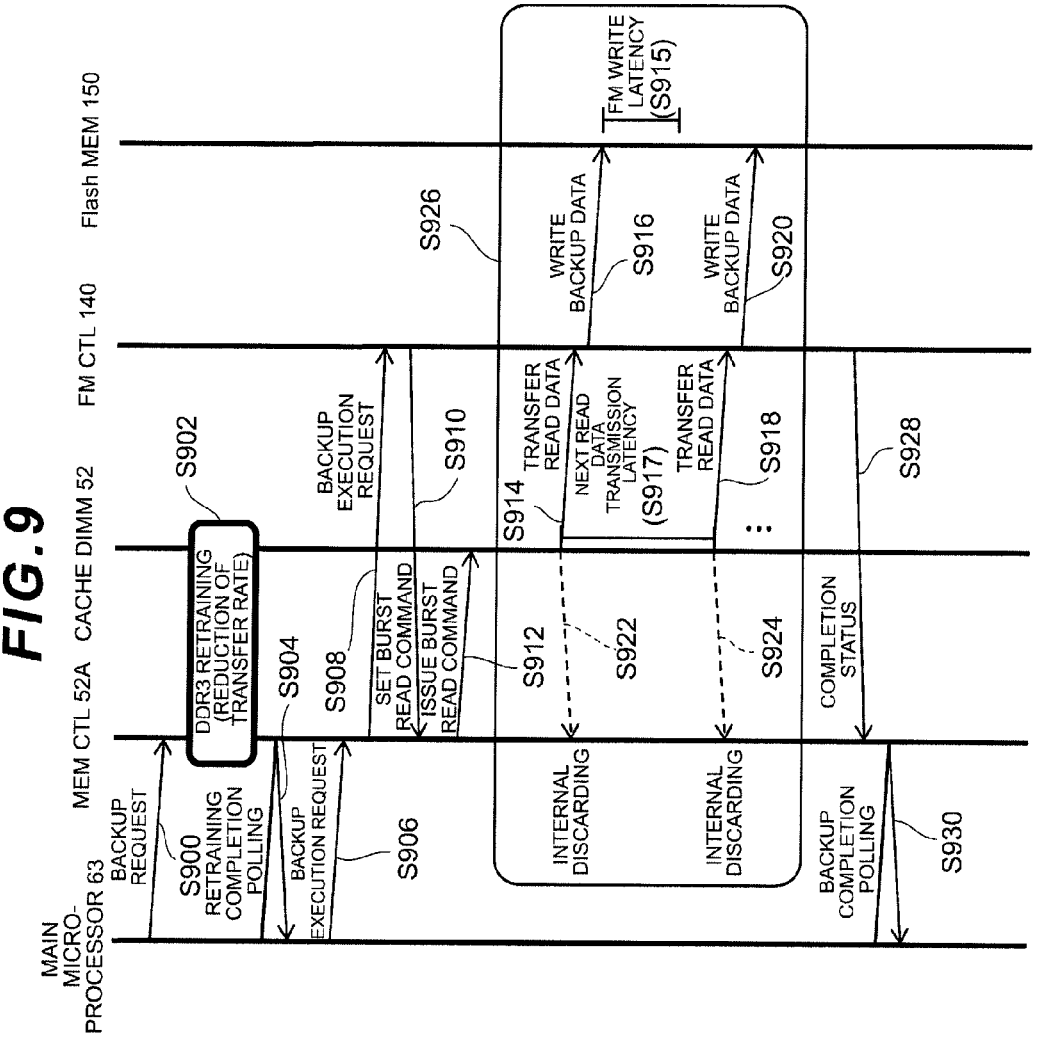
FIG. 9 is a timing chart showing the operation of the cache memory package when a system administrator causes a power failure of a storage controller in a planned manner.

Next, operations of the cache memory package (CM-PK) 55 will be explained. FIG. 9 is a timing chart showing the operation of the CM-PK 55 when the system administrator causes a planned power failure of the storage controller 16. the CPU 62 for the MP-PK 63 executes a main microprogram and sends a data backup request to the memory controller 52A (S900).

Each of the memory controller 52A and the cache DIMM 52 enter a retraining sequence for clock adjustment in order to reduce a clock frequency so that the data transfer timing for the interface will become a low data transfer speed (S902). This training sequence is specified by the DDR3 standards ("Initialization," "ZQ Calibration," and "MRS, MPR, Write Leveling" in JESD79-3, FIG. 1). It should be noted that lowering the frequency has the power saving effect.

After the memory controller 52A completes the retraining, it sets a flag indicating the completion of the retraining to a specified storage area. After the MP-PK 63 polls this flag (S904) and confirms that the flag is set, it sends a backup execution request to the memory controller 52A (S906). After receiving the backup execution request, the memory controller 52A sends the backup execution request to the FM controller 140 (S908).

After receiving this execution request, the FM controller 140 sets a burst read command to the memory controller 52A in order to have the memory controller 52A execute burst transfer of data in the cache DIMM 52 (S910). After the memory controller 52A issues the burst read command to the cache DIMM 52 (S912), the cache DIMM 52 executes burst transfer of read data to the memory controller 52A.

As the read data is being transferred from the cache DIMM 52 to the memory controller 52A (S914), the FM controller 140 buffers the read data and writes it to the flash memory cell unit 150 (S916; see 106 in FIG. 2B). Since the data transfer speed is then set to the low speed mode, data write latency (S915) at the FM DIMM 100 is smaller than latency in the data transfer until the next data transfer (S917), so that the write latency at the FM DIMM 100 will not become a bottleneck for the data backup.

The reference numeral S918 represents transfer of the read data and the reference numeral S920 represents writing of the next data. The data backup to the FM DIMM 100 continues until reading of all the pieces of data from the cache DIMM 52 is completed (S926). Meanwhile, the memory controller 52A internally discards the data read from the cache DIMM 52 (S922, S924).

Having finished backing up all the pieces of data from the cache DIMM 52, the FM controller 140 sets the completion status to the memory controller 52A (S928). The MP-PK 63 polls the completion status of the memory controller 52A; and if it recognizes the completion status of both the channels (101A, 101B), the processing sequence terminates.

Figure 10:
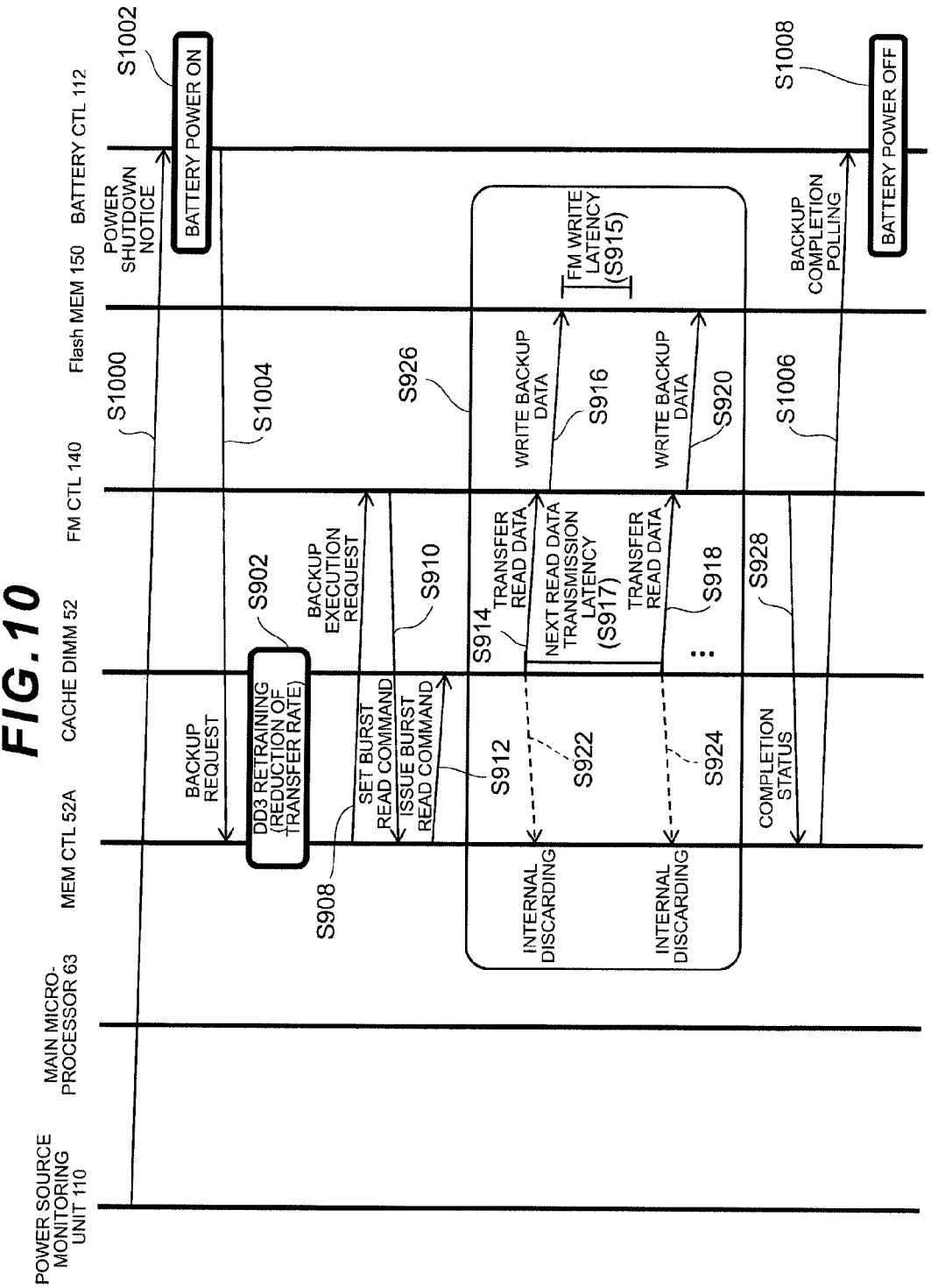
FIG. 10 is a timing chart showing the operation of the cache memory package when an unplanned power failure of the storage controller occurs.

FIG. 10 is a timing chart showing the operation of the CM-PK 55 when an unplanned power failure of the storage controller 16 occurs. The difference between this timing chart and the above-described time chart in FIG. 9 will be described below.

A reduction of the supplied power due to the power failure is detected by a power source monitoring unit 110 for the CM-PK 55. When the power source monitoring unit 110 detects a voltage decline, it notifies the battery controller 112 of power shutdown (S1000). After receiving this notice, the battery controller 112 turns on the power supply from the battery 114 to the memory controller 52A, the cache DIMM 52, and the FM DIMM 100 (S1002). Then, the battery controller 112 sends a backup request to the memory controller 52A (S1004).

After the data backup to the FM DIMM 100 is completed and the memory controller 52A receives the data backup completion status from the FM controller 140 with regard to the two channels (S928), it sends a data backup completion notice to the battery controller 112 (S1006). After receiving this transmission, the battery controller 112 turns off the power supply from the battery (S1008).

Figure 11:
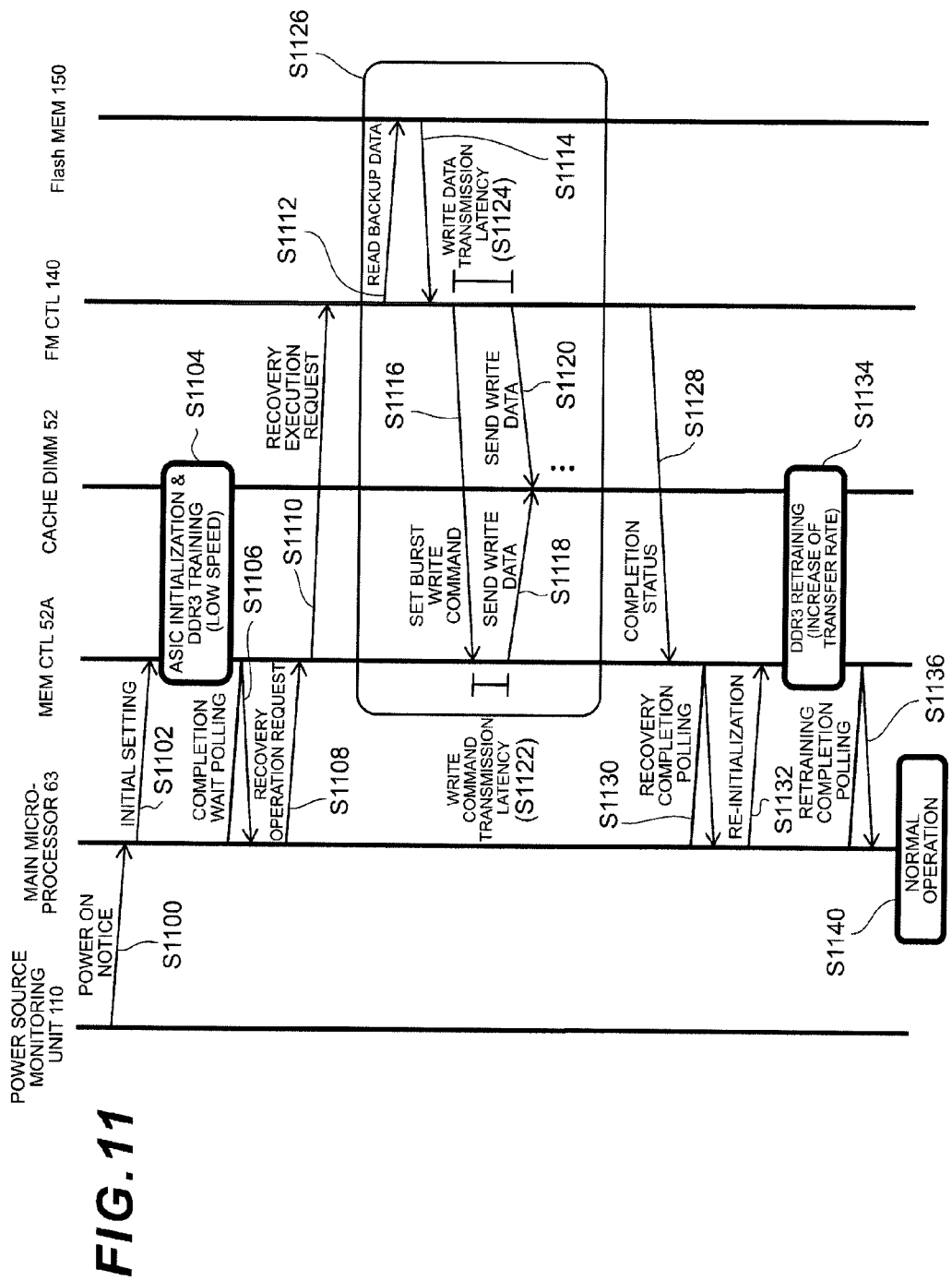
FIG. 11 is a timing chart showing the operation of the cache memory package when a storage apparatus recovers from the power failure after the completion of a data backup to the cache memory.

Next, the operation of the CM-PK 55 when the storage apparatus recovers from the power failure after the completion of the backup of data in the cache memory will be explained with reference to a timing chart in FIG. 11.

As the power source monitoring unit 110 for the CM-PK 55 detects resumption of power supply, it sends a power-on notice to the MP-PK 63 (S1100). After receiving this notice, the MP-PK 63 initializes the memory controller 52A in order to resume data transfer to the cache memory unit (S1102).

The memory controller 52A, together with the cache DIMM 52, enters the training sequence for clock adjustment in order to decrease the data transfer speed (S1104).

After the MP-PK 63 polls the memory controller 52A and confirms the completion of the training (S1106), it sends a restoration processing request to the memory controller 52A to request a recovery operation, that is, writing of all the pieces of data, which have been backed up to the FM DIMM 100, to the cache memory unit 52 (S1108). After receiving this request, the memory controller 52A transfers this request to the FM controller 140 (S1110).

After receiving this request, the FM controller 140 sends a command to the flash memory cell unit 150 to read the backup data (S1112). After receiving the backup data (S1114), the FM memory controller 140 sets a burst write command to the memory controller 52 (S1116).

Subsequently, the memory controller 52A sends a write command to the cache DIMM 52 (S1118) and the FM memory controller 140 sends the backup data to the cache DIMM 52 (S1120).

The cache DIMM 52 executes the write command sent from the memory controller 52A and writs write data to itself. The CM-PK 55 adjusts latency (S1122) for the memory controller 52A from setting of the burst write command until transmission of the write command, and latency (S1124) for the FMM controller 140 from transmission of the burst write command until transmission of the write data in order to synchronize transmission of the write command from the memory controller 52A to the cache DIMM 52 (S1118) with transmission of the write data from the FM controller 140 to the cache DIMM 52 (S1120).

The management program for the CM-PK 55 specifies the latency in advance and sets it to the memory controller 52A and a register for the FMM controller 140 in order to achieve the above-mentioned synchronization. The latency value which is set to the register is variable. Alternatively, the memory controller 52 may set the latency for synchronization when returning the backup data in the FM DIMM 100 to the cache DIMM 52.

The burst transfer of the backup data from the FM controller 140 to the cache DIMM 52 continues until all the pieces of data are returned from the FM DIMM 100 to the cache DIMM 52 (S1126).

After the FM controller 140 confirms that all the pieces of data have been transferred to the cache DIMM 52, it sends the completion status to the memory controller 52A (S1128). After the MP-PK 63 polls the memory controller 52A and confirms the completion status with regard to both the channels (S1130), it sends a re-initialization command to the memory controller 52A (S1132).

Next, the memory controller 52A and the cache DIMM 52 enter a retaining sequence to increase the clock frequency in order to increase the data transfer speed (S1134).

After the MP-PK 63 polls the memory controller 52A and confirms that the data transfer speed has changed to the high speed mode, the CM-PK 55 and the MP-PK 63 return to the normal operation, that is, the operation of the memory controller 52A to temporarily store write data and read data in the cache memory unit 52.

If the FM controller 140 is composed of an FPGA (Field Programmable Gate Array) in relation to the timing chart of FIG. 9, a soft error occurrence frequency will become higher than the case of the ASIC. So, the FM controller 140 includes the result of a CRC (Cyclic Redundancy Check) or the check result of an ECC (Error Correcting Code) in the completion status (S928); and once the memory controller 52A detects an error, it sends the backup execution request to the FM controller 140 again (S908).

Furthermore, in relation to the timing chart of FIG. 9, an operation example in which the FM controller 140 is a master and the memory controller 52A is a slave will be explained with reference to FIG. 12. Incidentally, FIG. 9 shows that the memory controller 52A is a master and the FM controller 140 is a slave. The difference between the timing chart in FIG. 12 and the timing chart in FIG. 9 will be described below.

Instead of S910, the memory controller 52A polls the FM controller 140 and judges whether the FM controller 140 is in the status capable of receiving command data or not. After the memory controller 52A checks this status, it issues a burst read command to the cache DIMM 52 (S912).

Next, after the completion of a data backup, the memory controller 52A polls the status (backup completion) of the FM controller 140 (S1200) instead of S928.

Figure 13A:
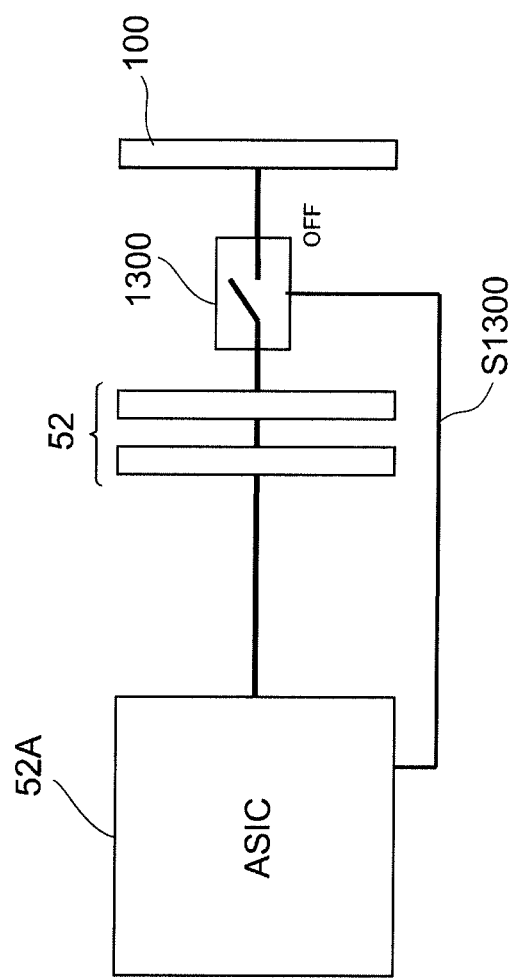
FIG. 13A is a block diagram of another example in which the nonvolatile memory package is mounted in the cache memory package and a switch is turned off.

Subsequently, another embodiment of mounting of the FM DIMM 100 on the cache memory package 55 will be explained. In the aforementioned embodiment (FIG. 2A, FIG. 2B), the FM DIMM 100 is mounted between the cache memory unit 52 and the memory controller 52A. Now, this embodiment is characterized, as shown in FIG. 13A and FIG. 13B, in that the FM DIMM 100 is located far from the memory controller 52A by placing the cache DIMM 52 between the FM DIMM 100 and the memory controller 52A.

Since the FM DIMM 100 exists at a data transmitting end, that is, at a position farthest from the memory controller 52A, the reflection will have a significant impact on the carrier waveform. Therefore, an eye pattern of the carrier waveform at the cache DIMM 52 becomes distorted and crosses over the pattern mask. As a result, the carrier wave transmission timing cannot be closed and the cache DIMM 52 cannot read or write data.

So, a switch 1300 for switching the bus 102 on or off is mounted on the input side of the FM DIMM 100 so that the memory controller 52A supplies a control signal S1300 to the switch 1300.

Figure 13B:
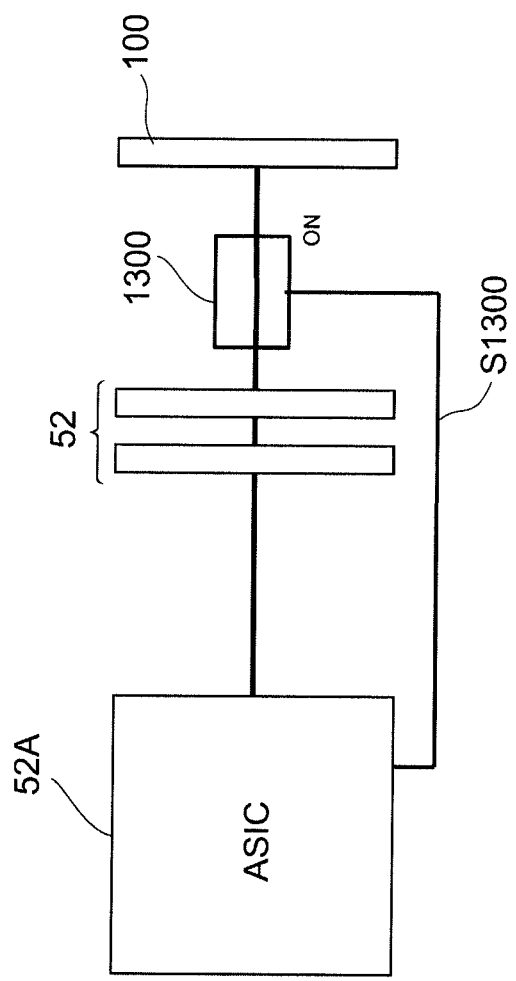

During the normal operation, the memory controller 52A resolves the impact of the reflection on the carrier wave by turning the switch 1300 off (FIG. 13A); and during a data backup, the memory controller 52A enables the FM DIMM 100 to write data by turning the switch 1300 on and decreasing the data transfer speed (FIG. 13B).

FIG. 14 shows eye pattern forms of the carrier waveform at each of the first cache DIMM (52-1), the second cache DIMM (52-2), and the FM DIMM 100 when turning the switch 1300 on or off according to this embodiment.

When the switch is turned off, the FM DIMM 100 is not connected to the bus 102. So, the reflection has no impact on the waveform transmitted through the bus 102. Therefore, the eye pattern 610 will not overlap with the pattern mask 612 at the first cache DIMM (52-1) and the second cache DIMM (52-2).

On the other hand, even if the switch is turned on and the FM DIMM 100 is connected to the bus 102, the data transfer speed is in the low speed mode, so that the impact of the reflection on the waveform transmitted through the bus 102 is buffered and the eye pattern 610 will not overlap with the pattern mask 612 not only at the first cache DIMM (52-1) and the second cache DIMM (52-2), but also at the FM DIMM 100.

Figure 15:
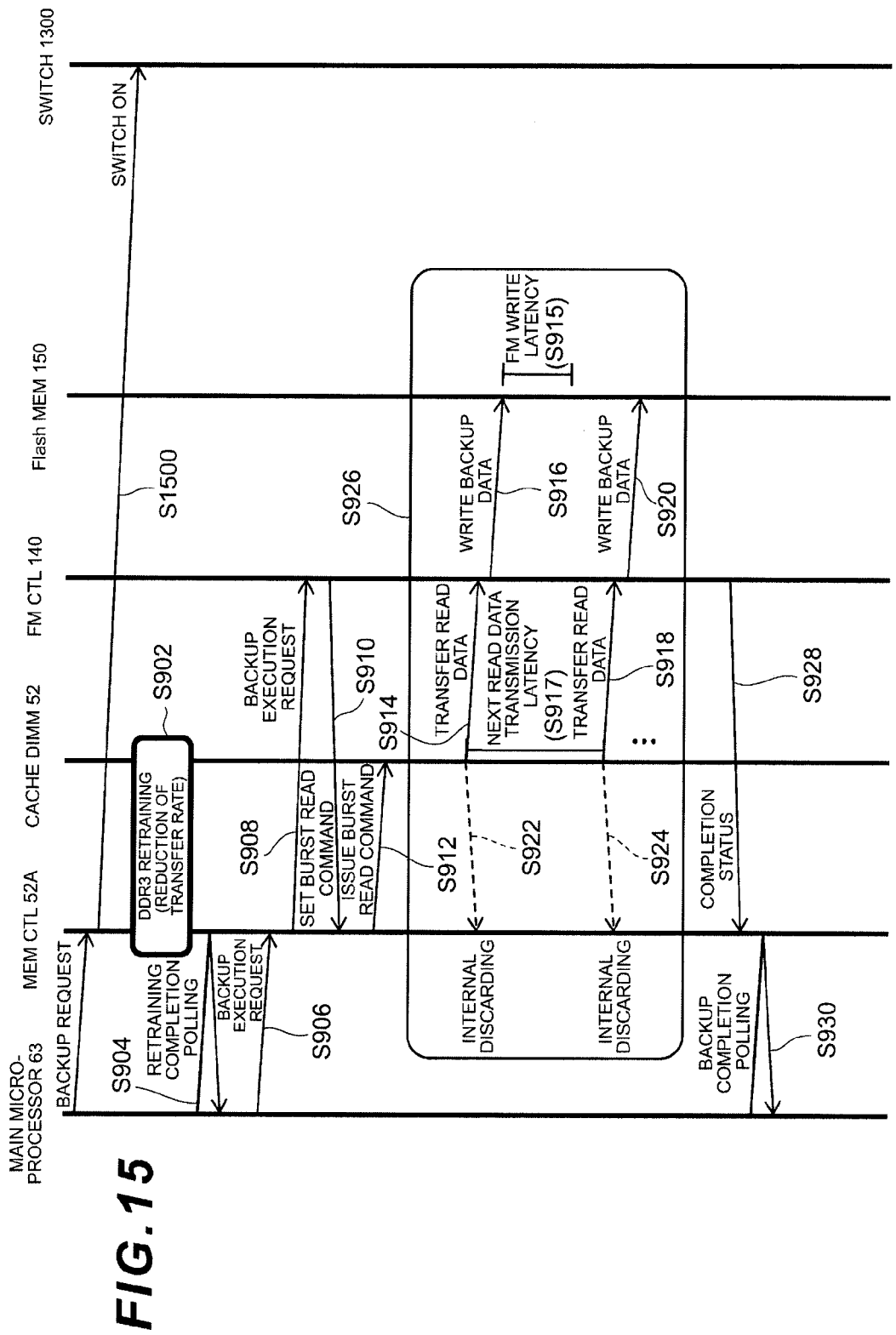
FIG. 15 is a timing chart showing the operation at the time of a planned power failure of the cache memory package according to this embodiment.

FIG. 15 is a timing chart showing the operation at the time of a planned power failure according to this embodiment. The difference between this timing chart and the timing chart described earlier with reference to FIG. 9 is that when data is backed up from the cache DIMM 52 to the FM DIMM 100, the memory controller 52A turns the switch 1300 on (S1500) and the FM DIMM 100 connects to the bus 102. Other steps of the operation are the same as those in FIG. 9. The FM DIMM 100 backs up data transmitted through the bus.

Figure 16:
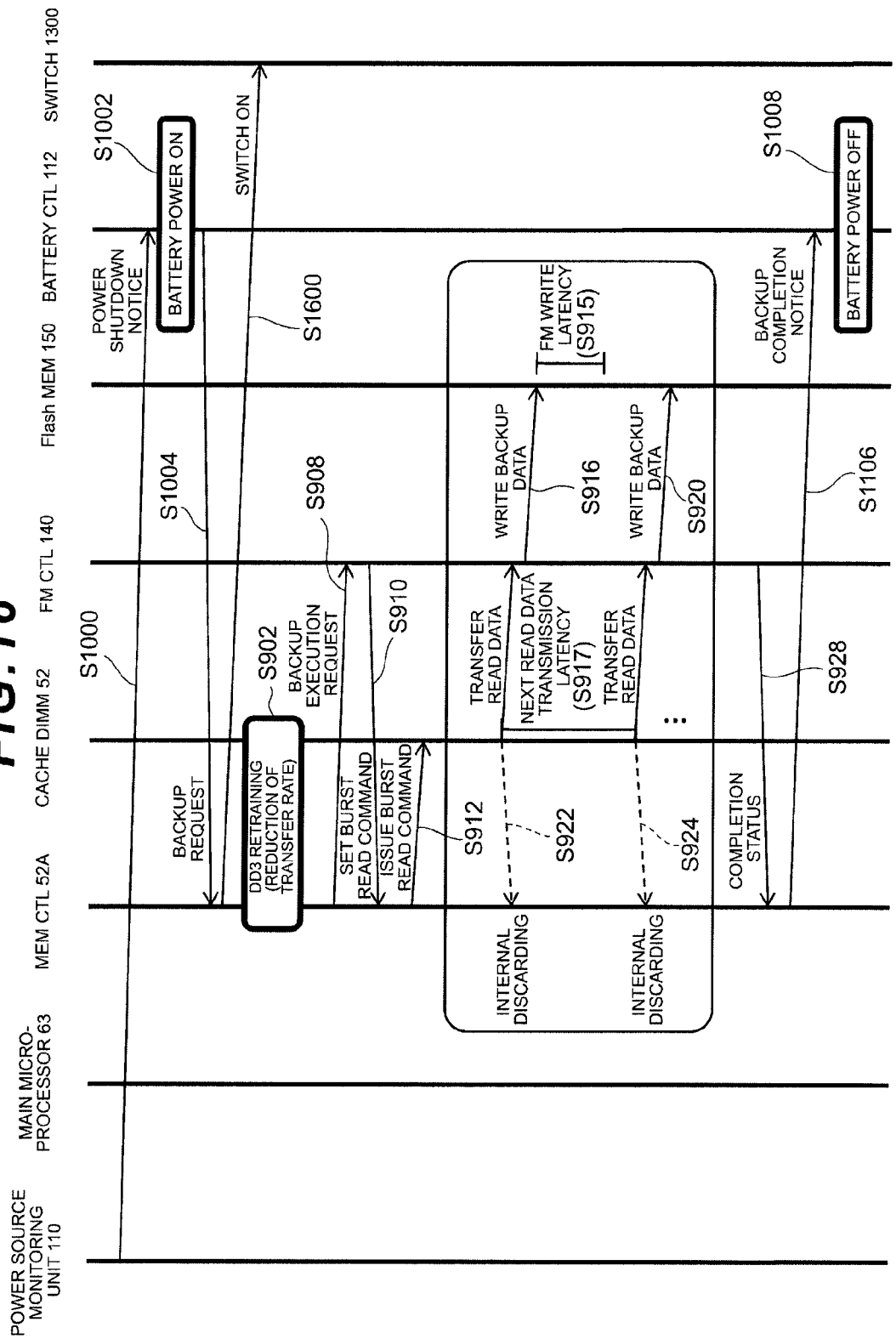
FIG. 16 is a timing chart showing the operation at the time of an unplanned power failure of the cache memory package according to this embodiment.

FIG. 16 is a timing chart showing the operation at the time of an unplanned power failure according to this embodiment. The difference between this timing chart and the aforementioned timing chart (FIG. 10) is that after the memory controller 52A receives a backup request from the battery controller 112 (S1004), the memory controller 52A sends an ON signal to the switch 1300 (S1600). When the memory controller 52A reads data from the cache DIMM 52, the FM DIMM 100 backs up the data transmitted through the bus 102.

Figure 17:
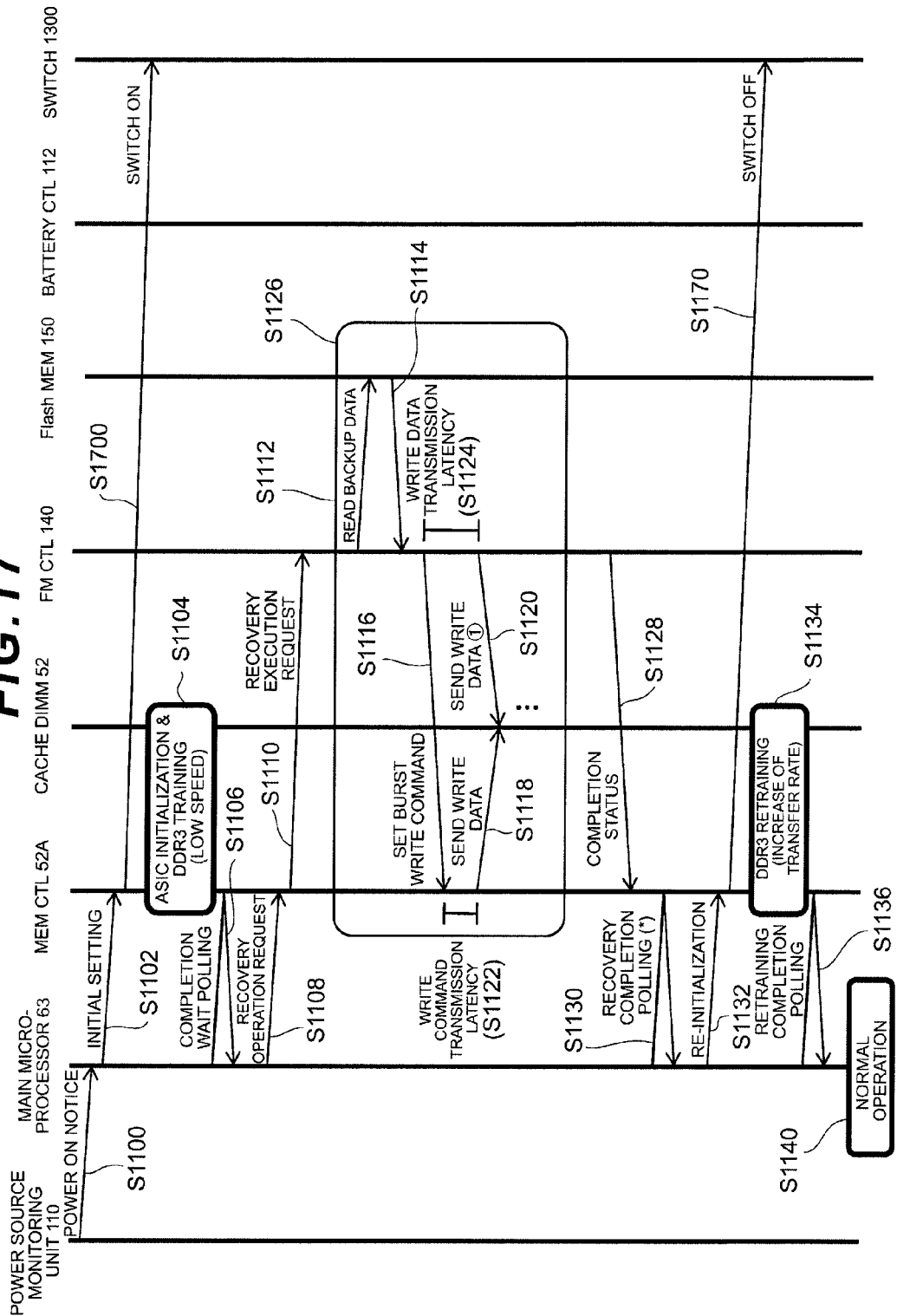
FIG. 17 is a timing chart showing a state where the cache memory package according to this embodiment is made to recover from a power failure.

FIG. 17 is a timing chart showing the operation of processing for recovering from a power failure according to this embodiment. The difference between this recovery operation and the recovery operation according to the aforementioned embodiment (FIG. 11) is that a step executed at the time of initialization (S1102) by the memory controller 52A of turning the switch 1300 on before the data backup processing (S1700) and a step executed at the time of re-initialization setting (S1132) by the memory controller 52A of turning the switch off before returning to the normal operation (S1170) are added to the timing chart in FIG. 11.

Figure 18:
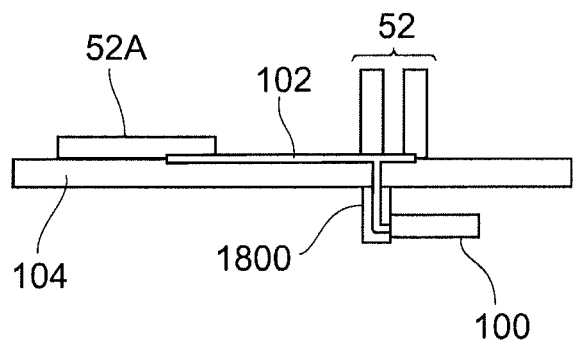
FIG. 18 is a side view of another example in which the nonvolatile memory package is mounted on the cache memory package.

Next, another embodiment will be explained with reference to FIG. 18. This embodiment is characterized in that the FM DIMM 100 is mounted on the backside of the cache DIMM 52 on the substrate 104 for the CM-PK 55. According to this embodiment, it is possible to prevent deterioration of the quality of the carrier waveform by setting a reflecting point based on the FM DIMM 100 to a position close to the cache DIMM 52 and thereby reducing the impact of the reflection on the carrier wave. Furthermore, if a socket 1800 capable of mounting the FM DIMM horizontally relative to the substrate on the backside of the substrate is placed between the FM DIMM 100 and the substrate 104, it is possible to improve space-saving on the backside of the substrate.

It should be noted that the backup data stored in the FM DIMM 100 is automatically erased after restoring all the pieces of data, which was backed up by the memory controller 52A to the FM DIMM 100, to the cache memory unit 52; and, therefore, separate processing for erasing the data afterwards is unnecessary

REFERENCE SIGNS LIST

10 Storage apparatus
12 Storage device (group)
14 Host system
16 Storage controller
52 Cache memory unit
52A Memory controller
55 Cache memory package
63 Main processor package
140 Flash memory controller
150 Flash memory

The invention claimed is:

1. A memory data backup system comprising:
a volatile memory module;
a nonvolatile memory module to which data of the volatile memory module is backed up; and
a memory controller for controlling a backup of the data from the volatile memory module to the nonvolatile memory module;
wherein the nonvolatile memory module is mounted on a bus with an interface between the memory controller and the volatile memory module; wherein the interface of the volatile memory module being of the same structure as an interface of the nonvolatile memory module; wherein the memory controller, the nonvolatile memory module and the volatile memory module being mounted on the bus; and wherein on a condition of backing up data, stored in the volatile memory, to the nonvolatile memory module where there has been a power failure, the data is transferred from the volatile memory module to the memory controller when the memory controller issues a read request to the volatile memory module, and when the data is being transferred, the memory controller voluntarily reads the data and backs up the data to the nonvolatile memory module.

2. The system according to claim 1, wherein the volatile memory module exists in a cache memory package for a storage controller for controlling data transmission between a host system and a storage device and temporarily stores the data,
wherein the cache memory package has a battery serving as a spare power source, and a controller for the battery; and if the cache memory package detects a power failure of the storage controller, it controls the battery controller and starts supplying power from the battery; and
wherein the memory controller receive the supplied power and backs up data from the volatile memory module to the nonvolatile memory module.

3. The system according to claim 1, wherein the nonvolatile memory module includes a flash memory and a flash memory controller for controlling reading of data from, and writing of data to, the flash memory.

4. The system according to claim 1, wherein the nonvolatile memory module is mounted on the bus at a position closer to the memory controller between the memory controller and the volatile memory module.

5. The system according to claim 1, wherein the nonvolatile memory module is connected to the memory controller and the volatile memory module via the same interface as the interface that is set between the memory controller and the volatile memory module.

6. The system according to claim 1, wherein the memory controller sets data transfer timing for the interface to a high speed mode when executing reading of data from, and writing of data to, the volatile memory module; and
sets data transfer timing for the interface to a low speed mode when backing up data stored in the volatile memory module to the nonvolatile memory module.

7. The system according to claim 6, wherein when backing up data in the volatile memory module to the nonvolatile memory module, the memory controller sets the data transfer speed to the low speed mode so that latency for data transfer by the interface becomes larger than data write latency for the nonvolatile memory module.

8. The system according to claim 6, wherein after setting the data transfer timing for the interface to the low speed mode, the memory controller makes a request to the nonvolatile memory module to return the data to the volatile memory module;
after receiving this request, the nonvolatile memory module makes a request to the memory controller to send a write command to the volatile memory module and then sends the data to the volatile memory module;
the memory controller sends the write command to the volatile memory module;
after receiving the write command, the volatile memory module stores the data sent from the nonvolatile memory module; and
after the nonvolatile memory module finishes sending the data to the volatile memory module, the memory controller sets the data transfer timing for the interface to the high speed mode.

9. The system according to claim 8, wherein the memory controller and the nonvolatile memory module synchronize transmission of the write command to the volatile memory module with transmission of the backup data.

10. The system according to claim 8, wherein the memory controller automatically erases the data in the nonvolatile memory after restoring the backup data in the nonvolatile memory to the volatile memory.

11. The system according to claim 1, wherein when backing up data stored in the volatile memory module to the nonvolatile memory module, the memory controller issues a read command to the volatile memory module; and as read data is transmitted from the volatile memory module through the bus, it is fed into, and thereby backed up to, the nonvolatile memory module.

12. The system according to claim 1, wherein the nonvolatile memory module is mounted on the bus farther than the volatile memory module relative to the memory controller;
wherein the system includes a switch for turning on or off the connection of the bus to the nonvolatile memory module; and
wherein while outputting a control signal for the switch and backing up the data from the volatile memory module to the nonvolatile memory module, the memory controller sets the switch from off to on.

13. The system according to claim 1, wherein the volatile memory exists in a cache memory package for a storage controller for controlling data transmission between a host system and a storage device and temporarily stores the data,
wherein the cache memory package has a battery serving as a spare power source, and a controller for the battery; and if the cache memory package detects a power failure of the storage controller, it controls the battery controller and starts supplying power from the battery;
wherein the nonvolatile memory module includes a flash memory and a flash memory controller for controlling reading of data from, and writing of data to, the flash memory;
the nonvolatile memory module is mounted on the bus at a position closer to the memory controller between the memory controller and the volatile memory module; and
the nonvolatile memory module is connected to the memory controller and the volatile memory module via the same interface as the interface that is set between the memory controller and the volatile memory module;
wherein the memory controller sets data transfer timing for the interface to a high speed mode when executing reading of data from, and writing of data to, the volatile memory module;
the memory controller sets data transfer timing for the interface to a low speed mode when backing up data stored in the volatile memory module to the nonvolatile memory module;
when backing up data in the volatile memory module to the nonvolatile memory module, the memory controller sets the data transfer speed to the low speed mode so that latency for data transfer by the interface becomes larger than data write latency for the nonvolatile memory module;
when backing up data stored in the volatile memory module to the nonvolatile memory module, the memory controller issues a read command to the volatile memory module; and as read data is transmitted from the volatile memory module through the bus, it is fed into, and thereby backed up, to the nonvolatile memory module;
after setting the data transfer timing for the interface to the low speed mode, the memory controller makes a request to the nonvolatile memory module to return the data to the volatile memory module;
after receiving this request, the nonvolatile memory module makes a request to the memory controller to send a write command to the volatile memory module and then sends the data to the volatile memory module;
the memory controller sends the write command to the volatile memory module;
after receiving the write command, the volatile memory module stores the data sent from the nonvolatile memory module;
after the nonvolatile memory module finishes sending the data to the volatile memory module, the memory controller sets the data transfer timing for the interface to the high speed mode; and
the memory controller and the nonvolatile memory module synchronize transmission of the write command to the volatile memory module with transmission of backup data.

14. A method for controlling backing up of data to a memory in which a nonvolatile memory module having an interface capable of connecting to an interface between a memory controller and a volatile memory module is mounted on a bus connected to the memory controller and the volatile memory module,
wherein the memory controller controls backing up of data in the volatile memory module to the nonvolatile memory module and returning of the backup data in the nonvolatile memory module to the volatile memory module; wherein an interface of the volatile memory module being of the same structure as the interface of the nonvolatile memory module; wherein the memory controller, the nonvolatile memory module and the volatile memory module being mounted on the bus; and wherein on a condition of backing up data, stored in the volatile memory, to the nonvolatile memory module where there has been a power failure, the data is transferred from the volatile memory module to the memory controller when the memory controller issues a read request to the volatile memory module, and when the data is being transferred, the memory controller voluntarily reads the data and backs up the data to the nonvolatile memory module.

* * * * *